United States Patent
Talbot

(10) Patent No.: US 9,718,697 B2
(45) Date of Patent: Aug. 1, 2017

(54) SYSTEMS AND METHODS FOR SUSTAINABLE REGENERATION OF CAUSTIC SOLUTIONS

(71) Applicant: iGen Technologies LLC, Long Beach, CA (US)

(72) Inventor: John R. Talbot, Long Beach, CA (US)

( * ) Notice: Subject to any disclaimer, the term of this patent is extended or adjusted under 35 U.S.C. 154(b) by 43 days.

(21) Appl. No.: 14/751,079

(22) Filed: Jun. 25, 2015

(65) Prior Publication Data

US 2016/0159658 A1 Jun. 9, 2016

Related U.S. Application Data

(60) Provisional application No. 62/089,776, filed on Dec. 9, 2014.

(51) Int. Cl.
| | | |
|---|---|---|
| *C01F 7/00* | (2006.01) | |
| *B01D 9/00* | (2006.01) | |
| *C02F 1/24* | (2006.01) | |
| *C02F 9/00* | (2006.01) | |
| *C01D 1/30* | (2006.01) | |
| *B01J 19/24* | (2006.01) | |

(52) U.S. Cl.
CPC ............. *C01D 1/30* (2013.01); *B01J 19/24* (2013.01); *B01J 2219/0002* (2013.01); *B01J 2219/00009* (2013.01); *B01J 2219/00022* (2013.01)

(58) Field of Classification Search
CPC ..... C01F 7/00; B01D 9/00; C02F 1/24; C02F 9/00
USPC ....................................................... 422/187
See application file for complete search history.

(56) References Cited

U.S. PATENT DOCUMENTS

| | | | | |
|---|---|---|---|---|
| 3,268,295 A | * | 8/1966 | Armbrust, Jr. et al. ...... | 423/625 |
| 3,649,184 A | * | 3/1972 | Featherston ......... | B01D 9/0036 23/301 |
| 4,168,689 A | * | 9/1979 | Parr .............................. | 123/509 |
| 4,275,042 A | * | 6/1981 | Lever ............................ | 423/130 |
| 4,536,286 A | * | 8/1985 | Nugent ......................... | 210/202 |
| 4,786,482 A | * | 11/1988 | The et al. ..................... | 423/130 |
| 4,836,990 A | * | 6/1989 | Swinkels et al. ............. | 423/130 |
| 4,997,553 A | * | 3/1991 | Clack .............................. | 210/97 |
| 5,093,092 A | * | 3/1992 | Misra et al. ................... | 423/130 |
| 5,439,256 A | * | 8/1995 | Brainard ................. | F16L 41/08 114/361 |
| 5,534,159 A | * | 7/1996 | Krieger .......................... | 210/704 |
| 8,298,054 B2 | * | 10/2012 | Hodge .................... | G05B 15/02 454/187 |
| 2005/0255013 A1 | * | 11/2005 | Teall et al. ..................... | 422/189 |
| 2006/0118581 A1 | * | 6/2006 | Clark ............................. | 222/333 |
| 2006/0163155 A1 | * | 7/2006 | Chauzy ................. | C02F 3/1221 210/605 |
| 2010/0212497 A1 | * | 8/2010 | Downs et al. .................. | 95/187 |

* cited by examiner

*Primary Examiner* — Walter D Griffin
*Assistant Examiner* — Huy-Tram Nguyen

(57) ABSTRACT

A portable shipping container provides an enclosure for holding tanks, pumps, filters and any other processing equipment necessary for implementing the treatment processes of a chemical treatment plant or other process tank system. The portable container can be configured in a variety of ways through the use of containment walls to separate the various components of the treatment plant. The treatment plant, as housed in the shipping container, can be easily moved or relocated. The shipping container serves as a secondary containment.

13 Claims, 2 Drawing Sheets

SYSTEMS AND METHODS FOR SUSTAINABLE REGENERATION OF CAUSTIC SOLUTIONS

CROSS-REFERENCE TO RELATED APPLICATIONS

This application claims priority under 35 U.S.C. Section 119(e) and the benefit of U.S. Provisional Application Ser. No. 62/089,776 filed Dec. 9, 2014, the entire disclosure of which is incorporated herein by reference in its entirety.

FIELD OF THE INVENTION

The present invention relates generally to sustainable regeneration of caustic solutions, and more particularly, to a modular and portable apparatus and method for carrying out regeneration processes.

BACKGROUND OF THE INVENTION

Soft aluminum extruders, such as Frontier Aluminum, produce aluminum extrusions that are used as window frames, door frames etc. A metal (iron-based) die is used in the extrusion press. Aluminum is extruded through the die, and the extruded aluminum is cut from the end of the die. Over time, the die of the extruder accumulates a residue of aluminum that obstructs the opening of the die, rendering it unusable. The residue needs to be cleaned from the die for extrusion operations to resume. An approach for cleaning the die is to immerse it in a caustic soda solution of sodium hydroxide to dissolve and remove the aluminum from the die's surfaces.

Typically, the sodium hydroxide solution is held in a tank, where the aluminum is dissolved from the dies. The sodium hydroxide in the solution dissolves the aluminum from the die in a chemical reaction by which the aluminum and the sodium react to form soluble sodium aluminate and hydrogen gas. The more the sodium hydroxide from the solution is consumed and transformed into sodium aluminate, the less effective the solution becomes at dissolving the aluminum from the die. To increase the performance of the caustic solution, the spent caustic solution may be pumped out for disposal as hazardous waste, and the tank is recharged with new chemicals.

An alternative to disposing the spent caustic solution is to regenerate the solution by employing a reaction that extracts the aluminum from the solution, thereby recovering sodium hydroxide from the spent caustic solution.

In one approach, the spent caustic solution may be pumped out and collected for transporting to a fixed chemical treatment plant. Fixed chemical treatment plants, generally stated, require infrastructure in that a containment berm at a minimum must be constructed and fixed tanks and equipment installed inside the containment berm. The installation of a fixed chemical treatment system typically includes pouring and curing a concrete berm, and then installing and anchoring the tanks and equipment inside the containment area.

One disadvantage to this approach is the need to pump out and to transport the spent caustic solution to the chemical treatment plant. Another disadvantage is the need to construct the chemical treatment plant. There is a need for an approach to regenerate caustic solutions that do not have such disadvantages.

BRIEF SUMMARY OF EMBODIMENTS

Present embodiments of the invention provide a chemical treatment plant or other process tank system housed in a shipping container. The container serves as a secondary containment. The container is constructed of materials and constructed in a way that satisfy the requirements for secondary containment of whichever chemical the chemical treatment plant or other process tank system is devised to process.

A portable shipping container provides an enclosure for holding tanks, pumps, filters and any other processing equipment necessary for implementing the treatment processes of the treatment plant. The portable container can be configured in a variety of ways through the use of containment walls to separate the various components of the treatment plant. The treatment plant, as housed in the shipping container, can be easily moved or relocated.

The above summary is not intended to limit the scope of the invention, or describe each embodiment, aspect, implementation, feature or advantage of the invention. The detailed technology and embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

Figure 1:
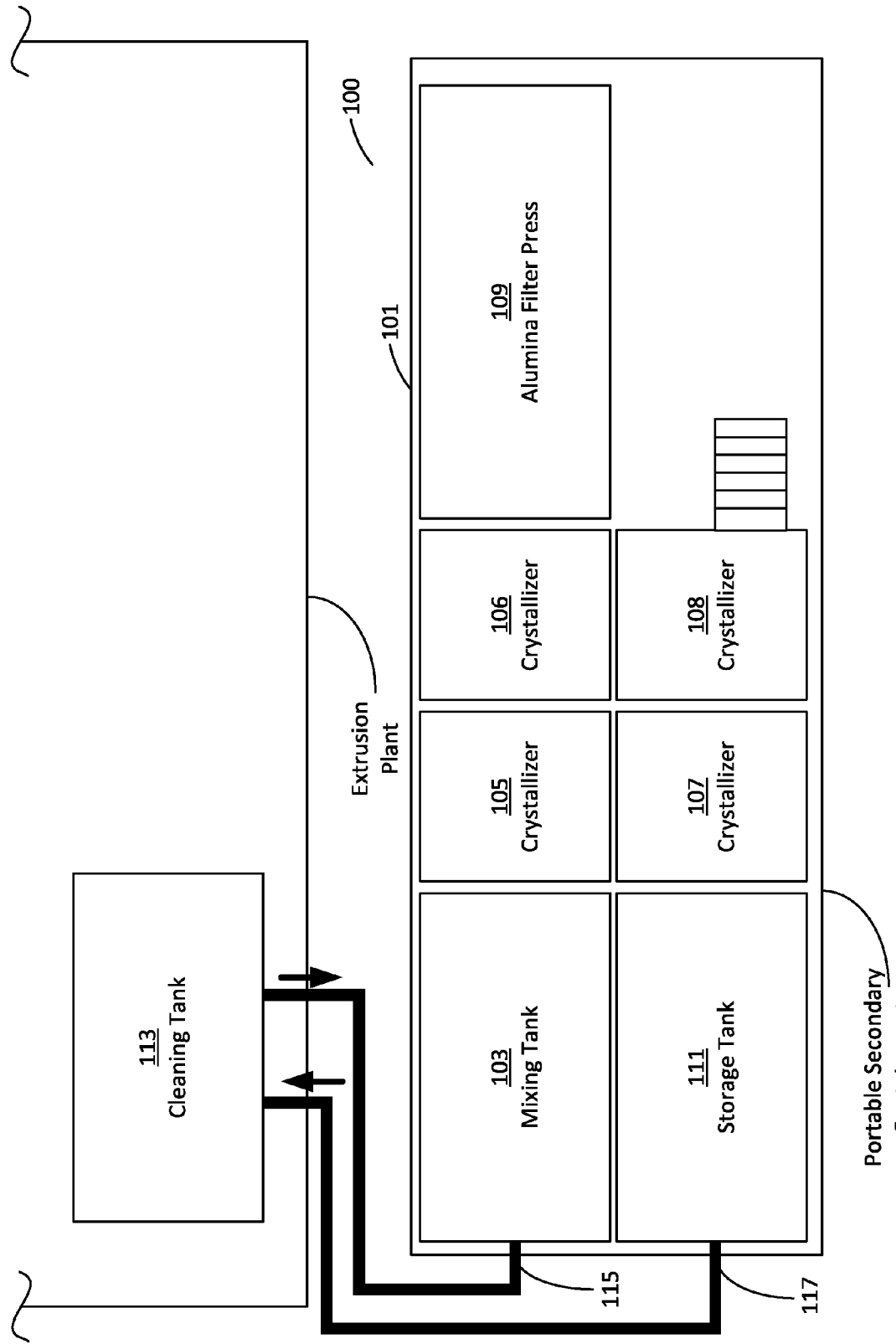
FIG. 1 shows an example of a container-housed caustic solution regeneration system, as attached to an cleaning tank to receive spent caustic solution and to send regenratated caustic solution, according to some embodiments.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION OF EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. These embodiments are not intended to limit the present invention to any specific example, environment, application, or particular implementation described herein. Therefore, descriptions of these example embodiments are only provided for purpose of illustration rather than to limit the present invention.

Overview

FIG. 1 shows an example of a chemical treatment plant 100 housed in a shipping container 101, according to some embodiments. According to some embodiments, a shipping container 101 encloses a self-contained chemical treatment plant 100. In some embodiments, a shipping container of 53' is used, while it is understood that longer or shorter shipping containers than 53' may be used without departing from the scope and spirit of the invention. In some other embodiments, a shipping container encloses a self-contained hazardous materials and/or hazardous waste storage. It has the significant benefits of: being portable; easily configurable; being able to be made compatible with virtually all chemicals based on materials of construction; providing built-in secondary containment; and including tank overflow protection and protection from exposure to storm water. Present embodiments provide much simpler and cost effective system for implementing small to medium size chemical treatment systems, as compared to building a typical, fixed site chemical treatment plant. The shipping container treatment systems further meets the EPA definition for a secondary containment tank design. While this example is described with respect to a chemical treatment plant, it is understood that other process tank systems may be similarly housed in shipping container without departing from the scope and spirit of the invention.

While the examples described herein generally relate to a shipping container housing a caustic regeneration system, it is understood that the system may be configured for numerous applications concerning chemical/hazardous materials/hazardous waste systems, including:
- a portable container configured to house a hazardous materials or hazardous waste storage unit;
- a portable container configured to house a storm water treatment system;
- a portable container configured to house an air pollution control system;
- a portable container configured to house a water treatment system;
- a portable container configured to house a chemical manufacturing plant;
- a portable container configured to house a mobile automotive fluids and dispensing facility; and
- a portable container configured to house a facility to support a gold mining or other mining operation.

Process for Caustic Solution Regeneration

In a cleaning tank, sodium hydroxide is consumed when the aluminum from a die dissolves in the cleaning tank. The chemical reaction is as follows:

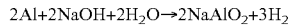

The result of the chemical reaction is the production of soluble sodium aluminate and hydrogen gas. As more and more aluminum is dissolved in the cleaning tank, the sodium aluminate concentration will increase and the caustic soda concentration will decrease. Without regeneration, caustic soda performance will deteriorate, and eventually the solution will be spent and will stop or nearly stop dissolving aluminum. To continue dissolving, the caustic soda is pumped out for disposal as hazardous waste, and the tank is recharged with new chemicals.

In some embodiments, the Bayer process is used to regenerate the spent solution to produce alumina trihydrate and sodium hydroxide, also called caustic soda, in a controlled manner. This reaction occurs as follows:

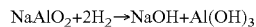

The net reaction of cleaning followed by regeneration is then:

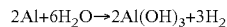

Caustic soda therefore acts as a catalyst in the dissolving of aluminum. It is possible to recover nearly all of the sodium hydroxide, minus minor drag-out loss, that was used in the cleaning process with a properly designed caustic solution regeneration system. The alumina trihydrate produced is a valuable product that can be extracted for sale. The sodium hydroxide recovered from the regeneration process can be returned to the cleaning bath for reuse, minimizing the need to purchase virgin caustic soda. The disposal of spent caustic solution is eliminated, and in some embodiments, waste is reduced by over 99.9%.

Caustic Solution Regeneration System

According to some embodiments, and with further reference to FIG. 1, the caustic solution regeneration system is housed inside a portable and sealed container, such as a shipping container 101, and comprises one or more mixing tanks 103, a plurality of crystallizer tanks 105, 106, 107, 108, an alumina filter press 109, and one or more storage tanks 111.

An aluminum extrusion plant typically includes an cleaning tank 113 for dissolving aluminum from extrusion dies. In the cleaning tank 113, parts are immersed in a hot caustic cleaning tank, which dissolves aluminum that is stuck to the metal die. When the aluminum is dissolved off the die, the part is rinsed and is ready to be reused.

Figure 2:
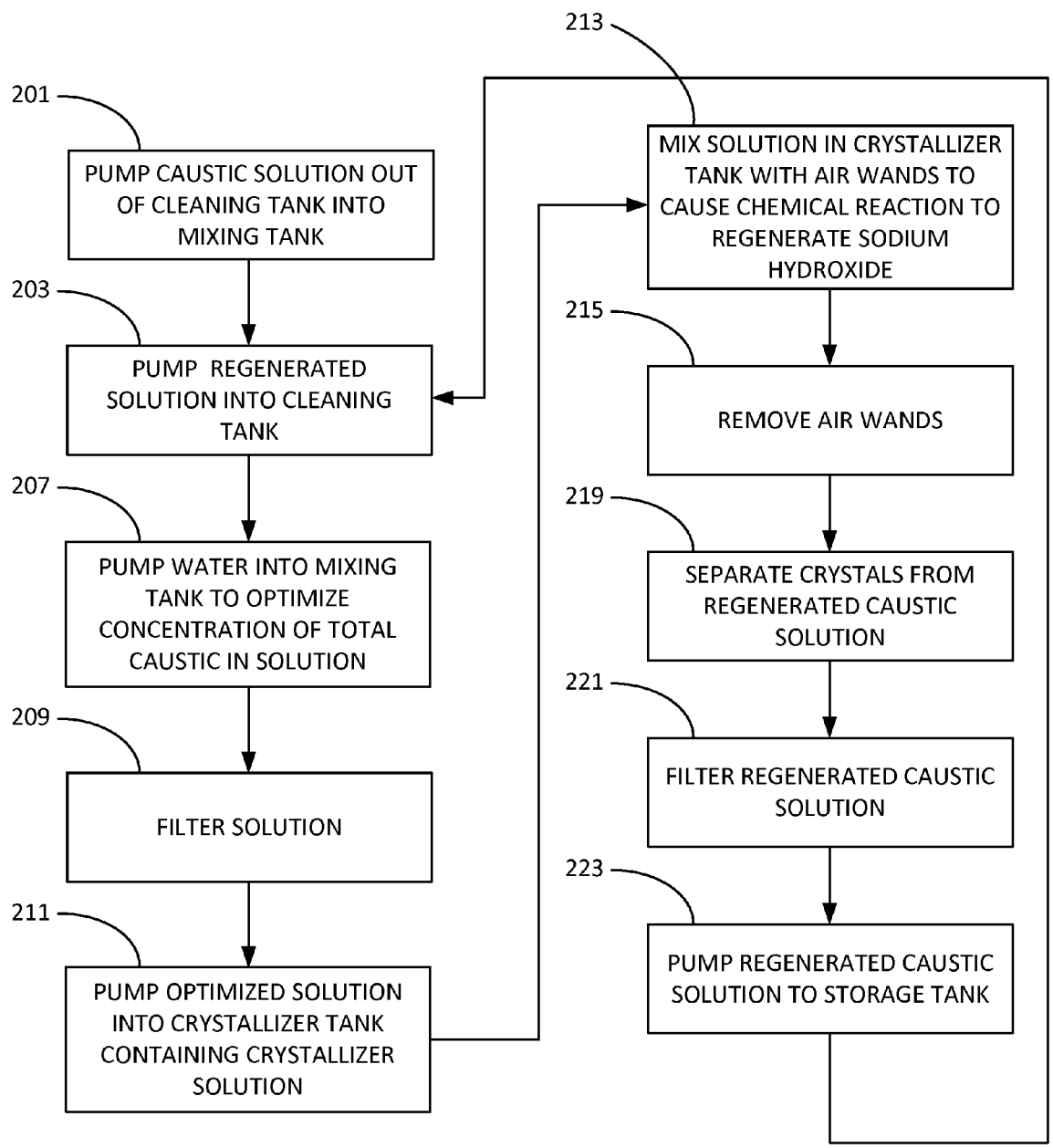
FIG. 2 is a flow diagram showing a process for regenerating a caustic solution in a self-contained portable chemical treatment plant or other process tank system, according to some embodiments.

FIG. 2 is a flow diagram showing a process for regenerating a caustic solution in a self-contained portable chemical treatment plant, according to some embodiments. According to some embodiments, at step 201, as the dissolved aluminum level increases and the sodium hydroxide level decreases in the cleaning tank 113, caustic solution is pumped out of the cleaning tank into the mixing tank, and at step 203, regenerated solution from the regeneration system is pumped into the cleaning tank. At step 207, water is added to the mixing tank to optimize the concentration of total caustic, comprising free sodium hydroxide and sodium aluminate. In some embodiments, an optimal concentration of total caustic is such that the free caustic and bound caustic equals 25 N points when titrated with 1 N Sulfuric acid to an endpoint of pH=8.2.

At step 209, the resulting solution is optionally filtered through a standard membrane filter to remove solid contaminants. At step 211, the solution then is pumped into one of the crystallizer tanks, which contains a crystallizer bath having a particular concentration of alumina trihydrate crystals, to form a crystallizer solution. In some embodiments, the concentration of alumina trihydrate crystals is in the range between 30 and 55 percent. In some embodiments, the concentration of crystal levels is monitored and controlled by a settling test.

At step 213, inside the crystallizer tank, the crystallizer solution is well-mixed by air agitation for a period of one to 24 hours time using air mixing wands. Using air mixing wands provides the advantage of achieving good crystal suspension and the mixing wands are vitually maintenance free. Mixing time is determined by the reaction rate. In some embodiments, the mixing time is faster for the simple chemistry of the caustic die cleaning solution. By the action of the air agitation inside the crystallizer tanks, a chemical reaction occurs in the crystallizer solution in which the dissolved aluminum (sodium aluminate) reacts with the alumina trihydrate crystals, resulting in the regeneration of sodium hydroxide and the precipitation of aluminum as alumina trihydrate crystal.

At step 215, the air mixing wands are removed from the crystallizer bath, and at step 219, the crystals from the resulting solids-laden solution are separated from the regenerated caustic solution to produce a clear supernatant. In some embodimens, the crystals are allowed to settle to the bottom of the crystallizer tank. The optimal time will be determined by trial studies for each process facility. In some embodiments, solids from the solids-laden solution are separated from the supernatant by using a filter press, a centrifuge, a belt filter, a vacuum disc filter, or other solid-liquid separation and dewatering methods without departing from the scope and spirit of the invention. At step 221, the settled solution is optionally pumped through a filter press to remove any suspended alumina trihydrate crystals.

In some embodiments, the process repeats when the clear supernatant is pumped into the cleaning tank after caustic solution is pumped out of the cleaning tank. In some embodiments, at step 223, the clear supernatant of regenerated caustic solution is pumped into a regeneration system storage tank for later use. In some embodiments, the regeneration system storage tank is pre-heated with an immersion heater, or other heat source.

The regeneration system further comprises a continuous process of exchanging spent and rengenerated caustic solution with the cleaning tank, allowing the cleaning tank to operate indefinitely. After spent hot caustic soda is pumped out of the cleaning tank into the mixing tank, returning to step 205, an amount of regenerated solution from the storage tank is pumped into the cleaning tank.

In some embodiments, the regeneration system precipitates up to 20 ounces per gallon of aluminum depending on the concentration of the sodium aluminate in the die cleaning solution. In some embodiments, the regeneration system typically precipitates three to five ounces per gallon of aluminum in the crystallizer in the regeneration of the caustic solution. Accordingly, each pound of aluminum dissolved in the cleaning tank produces about three pounds of alumina trihydrate. In some embodiments, by monitoring the volume of caustic solution cleaned within any given period, the system is controlled such that sufficient caustic solution is processed through the regeneration system to precipitate amount of aluminum in the form of alumina trihydrate crystal that is approximately equal the amount of aluminum being dissolved in the cleaning tank. A relatively steady state of caustic and dissolved aluminum concentrations is achieved, and the cleaning tank can operate indefinitely with little or no additional new sodium hydroxide being added to the cleaning tank. Accordingly, caustic loss can be limited to loss through drag-out from rinsing operations.

The following is an example of a set of key parameters used in the process described above, according to some embodiments.

Key Parameters
$N_1$—dissolved caustic soda
$N_2$—dissolved aluminum
Total caustic=$N_1+N_2$
"Spread"—the difference in N points between the $N_1$ and $N_2$ in any given tank
Seed content (% volume solids in the crystallizer tank)

where $N_1$=mls of 1 N sulfuric acid required to titrate a 5-ml sample of caustic solution to pH=11.2, and $N_2$=mls of 1 N sulfuric acid required to titrate a 5-ml sample of caustic solution to pH=8.3, minus $N_1$.

The regeneration system provides several key advantages over traditional methods of regenerating caustic solutions. Present embodiments of the invention provide portability because the container-housed regeneration system can be installed or moved to a new location. Because there is one pipe in and one pipe out of the regeneration system, it provides a simple interface with the cleaning tank, and allows for "plug and play" operation at a plant site. The floor of the shipping container is modified to be water tight, and can therefore act as secondary containment for the caustic solution regeneration system, negating the need for construction of a containment berm or other facility modifications at the cleaning facility. According to some embodiments, built-in sensors in the shipping container will detect any leaks from process tanks or equipment. The materials of construction of the shipping container, including the lining, can be such that the shipping container can be used and is compatible with virtually all chemicals. The container can also be fitted with solar panels for electrical needs of equipment installed instead the container.

According to some embodiments, the container is fitted with bulkhead fittings for transfer of materials or fluids that, in the case of failure, drain materials into the shipping container's secondary containment instead of outside the container. Bulkhead fittings include secure fittings 115 and 117 on the side of the container used for connecting the cleaning tank of the die cleaning process to the regeneration facility 101. Bulkhead fittings include a transfer hose connection, a water connection, an air connection, and an electrical connection.

In some embodiments, a fixed roof or tarp provides protection from contact with storm water, and the container itself has built-in secondary containment, thereby qualifying the container for a "No Exposure Certification." In some embodiments, the roof is configured as fixed or removable, which provides advantages for secondary containment. In some embodiments, exhaust fans are installed in a fixed roof. In some embodiments, the fixed roof can be opened to provide ventilation.

In some embodiments, a baffle is installed in the shipping container to segregate chemical containing areas from non-chemical containing areas. In some embodiments, multiple baffles are installed for segregation of incompatible chemicals.

Using the shipping container to house the chemical treatment plant, or other process tank system or storage unit negates the need to build a secondary containment berm in a traditional chemical treatment facility. The entire container can be certified as required for hazardous waste treatment facilities containing tanks.

The above system and processes is applicable to the cleaning of dies in the soft aluminum extrusion industry. The system and process may also be used for cleaning dies for the hard aluminum extrusion industry. In this process, the steps as described above are applicable. Further, the heavy metal alloying elements of copper and zinc are precipated as well, using sodium sulfide. This step is necessitated to prevent the heavy metals from increasing the total dissolved metals, preventing the cleaning solution from further dissolving and cleaning aluminum from the dies.

While the examples shown and described above are in relation to the a container-housed regeneration system, it is understood that the container may be used for other chemical operations, those involving the exchange of chemicals with a fixed structure, without departing from the scope and spirit of the invention.

Other features, aspects and objects of the invention can be obtained from a review of the figures and the claims. It is to be understood that other embodiments of the invention can be developed and fall within the spirit and scope of the invention and claims.

The foregoing description of some embodiments of the present invention has been provided for the purposes of illustration and description. It is not intended to be exhaustive or to limit the invention to the precise forms disclosed. Various additions, deletions and modifications are contemplated as being within its scope. The scope of the invention is, therefore, indicated by the appended claims rather than the foregoing description. Further, all changes which may fall within the meaning and range of equivalency of the claims and elements and features thereof are to be embraced within their scope.

What is claimed is:

1. A portable system for regenerating a caustic solution, comprising:
    a transportable container module having a floor and walls, the container module configured to contain liquid chemicals without leaking outside the module;
    the container module containing a regeneration system, the regeneration system configured to remove aluminum and to increase the concentration of sodium hydroxide in a caustic solution, the regeneration system comprising:
    a mixing tank inside the container module, the mixing tank configured to receive caustic solution from a cleaning tank outside the container module, the mixing tank further configured to receive water that is added to the caustic solution to optimize the concentration of total caustic;
    a crystallizer tank inside the container module, the crystallizer tank configured to receive the caustic solution from the mixing tank;
    a crystallizer bath in the crystallizer tank having a concentration by volume of alumina tri hydrate crystals, the alumina trihydrate crystals having a concentration in the range between 30 and 55 percent, the alumina trihydrate crystals mixing with the caustic solution in the crystallizer tank to form a crystallizer solution;
    a plurality of air mixing wands, the air mixing wands configured to mix the crystallizer solution by air agitation to create a chemical reaction that regenerates sodium hydroxide and precipitates alumina trihydrate crystals, wherein after said chemical reaction, the crystallizer solution comprises a supernatant of a regenerated caustic solution and a plurality of said alumina trihydrate crystals; and
    one or more bulkhead fittings used for connecting the cleaning tank to the module.

2. The portable system of claim 1, wherein the container module includes one or more openings configured to receive spent caustic solution from the cleaning tank, or to release regenerated caustic solution into the cleaning tank.

3. The portable system of claim 1, the regeneration system further comprising a membrane filter, the membrane filter configured to carry out the step of filtering the caustic solution through the membrane filter to remove solid contaminants.

4. The portable system of claim 1, wherein the air mixing wands are further configured to mix the crystallizer solution for a duration, the duration dependent on a reaction time of the crystallizer solution to regenerate sodium hydroxide and precipitate alumina trihydrate crystals.

5. The portable system of claim 1, wherein the precipitated alumnia trihydrate crystals are allowed to settle to the bottom of the crystallizer tank.

6. The portable system of claim 1, wherein the regeneration system further comprises a pump configured for pumping the supernatant into a storage tank.

7. The portable system of claim 1, wherein the regeneration system further comprise a pump configured for pumping the supernatant into the cleaning tank.

8. The portable system of claim 1, wherein the regeneration system is configured to control the volume of the caustic solution received in the mixing tank over a period of time such that a quantity of aluminum precipitated from said chemical reaction is approximately equal to the amount of aluminum being dissolved in the cleaning tank.

9. The portable system of claim 1, wherein the one or more bulkhead fittings, when failing, are configured to drain materials into the container module.

10. The portable system of claim 1, further comprising one or more baffles to one or more segregate chemical areas.

11. The portable system of claim 1, wherein the container module meets EPA definition for a secondary containment tank design.

12. The portable system of claim 6, wherein the storage tank is pre-heated with a heat source.

13. The portable system of claim 1, wherein the supernatant formed from said chemical reaction is removed from the crystallizer solution using any one or more of a filter press, a centrifuge, a belt filter, a vacuum disc filter, to separate the alumina trihydrate crystals from the supernatant.

* * * * *